B. Ott,
Clothes Tongs,
No. 63,083. Patented Mar. 19, 1867.

Witnesses:
Theo Tusche
Wm. Trewin

Inventor:
Benedict Ott
Per Munn & Co.
Attorneys

United States Patent Office.

BENEDICT OTT, OF LA CROSSE, WISCONSIN.

Letters Patent No. 63,083, dated March 19, 1867.

IMPROVED CLOTHES TONGS.

*The Schedule referred to in these Letters Patent and making part of the same.*

TO ALL WHOM IT MAY CONCERN:

Be it known that I, BENEDICT OTT, of La Crosse, La Crosse county, Wisconsin, have invented a new and improved Clothes Tongs; and I do hereby declare that the following is a full, clear, and exact description thereof, which will enable others skilled in the art to make and use the same, reference being had to the accompanying drawings forming part of this specification, in which—

Similar letters of reference indicate corresponding parts.

Figure 1:
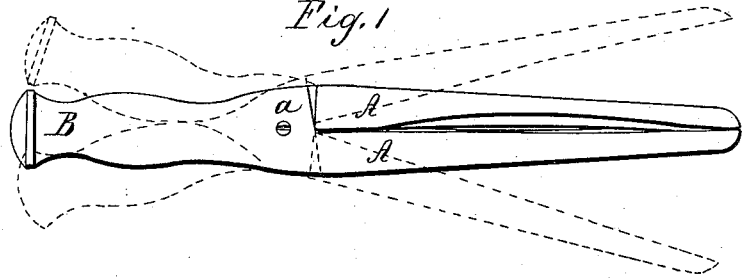
Figure 1 is a side view of my invention.
Figure 2:
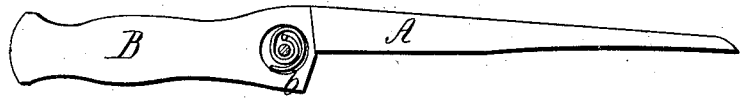
Figure 2 is an inside view of one of the legs of the tongs.
Figure 3:
Figure 3 is a sectional view showing the joint connection of the legs.

The object of this invention is to provide a convenient utensil for the use of women in washing clothes, whereby they can lift and handle clothes when hot in a boiler or tub, without exposing themselves to being scalded, and also in excessively cold water for rinsing, &c., without contact of the hands to chill them. The invention consists of a pair of wooden tongs made very simply and cheaply, and is intended as an effective substitute for the common single wash-stick in ordinary use, which is very inefficient for the purpose of lifting clothes from a boiler.

A stick of wood twenty-five or thirty inches long is turned to the proper size and shape, as represented in the drawings. One end is sawed through longitudinally the depth of say twenty inches, to form the legs of the tongs A A, and the other end is sawed through at right angles longitudinally, till the scarfs of the sawing of both ends meet, in order to form the double handle B. At the junction of the scarfs the stick is cut to make two pieces by mortising or slitting the wood crosswise down to both scarfs on opposite sides, as shown in the drawings. The two pieces are then jointed to each other with a rivet or screw, $a$, near the junction of the legs A A with the handle B, to form a pair of tongs. A circular recess is cut in the inside of both parts of the handle at the joint, and in the recess is fitted a coil spring, $b$, which is so fastened at the ends in each piece that the legs shall expand when the handle is not compressed. A flat spring may be used with the same effect, placed inside of the legs of the tongs.

I claim as new, and desire to secure by Letters Patent—

The legs A and handle B, with blades formed at right angles to them, pivoted together at $a$, and provided with the spring $b$ which holds the legs A open, constructed and arranged as herein set forth.

The above specification of my invention signed by me this third day of January, 1867.

BENEDICT OTT.

Witnesses:
JOSEPH BARTA,
WACLAO KOEANDA.